US011758251B2

(12) United States Patent
Ahn et al.

(10) Patent No.: US 11,758,251 B2
(45) Date of Patent: Sep. 12, 2023

(54) CAMERA MODULE AND VEHICLE CAMERA

(71) Applicant: LG INNOTEK CO., LTD., Seoul (KR)

(72) Inventors: Jae Wook Ahn, Seoul (KR); Sun Min Hwang, Seoul (KR); Je Kyung Park, Seoul (KR); Kyung Mok Yoon, Seoul (KR); Chul Ho Lee, Seoul (KR); Jong Chul Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/805,383

(22) Filed: Jun. 3, 2022

(65) Prior Publication Data

US 2022/0311913 A1     Sep. 29, 2022

Related U.S. Application Data

(63) Continuation of application No. 17/203,262, filed on Mar. 16, 2021, now Pat. No. 11,381,718, which is a
(Continued)

(30) Foreign Application Priority Data

Sep. 1, 2015   (KR) .................. 10-2015-0123531

(51) Int. Cl.
*H04N 23/51*      (2023.01)
*B60R 1/00*       (2022.01)
(Continued)

(52) U.S. Cl.
CPC ............... *H04N 23/51* (2023.01); *B60R 1/00* (2013.01); *B60R 11/04* (2013.01); *G03B 17/02* (2013.01);
(Continued)

(58) Field of Classification Search
CPC .... H04N 5/2252; H04N 5/225; H04N 5/2253; H04N 5/2254; H04N 5/2257;
(Continued)

(56) References Cited

U.S. PATENT DOCUMENTS 6,151,065 A * 11/2000 Steed ................... G08B 15/001
348/E7.086
10,440,242 B2   10/2019 Ahn et al.
(Continued)

FOREIGN PATENT DOCUMENTS

CN       1463141 A    12/2003
CN       1873528 A    12/2006
(Continued)

OTHER PUBLICATIONS

Supplementary European Search Report dated Jul. 26, 2018 in European Application No. 16842242.6.
(Continued)

*Primary Examiner* — Ahmed A Berhan
(74) *Attorney, Agent, or Firm* — Saliwanchik, Lloyd & Eisenschenk (57) ABSTRACT

An embodiment of the present invention relates to a camera module comprising: a housing comprising a through hole; a lens module disposed in the through hole; a connector penetrating the housing and extending to an outside from an inside of the housing; a first substrate unit located inside the housing and having an image sensor mounted thereon; a second substrate unit disposed inside the housing and connected to the connector; and a flexible substrate for electrically connecting the first substrate and the second substrate unit, wherein the flexible substrate is coupled to a lower surface of the first substrate unit and a side surface of the second substrate.

15 Claims, 8 Drawing Sheets

Related U.S. Application Data continuation of application No. 16/554,316, filed on Aug. 28, 2019, now Pat. No. 10,979,606, which is a continuation of application No. 15/756,443, filed as application No. PCT/KR2016/009635 on Aug. 30, 2016, now Pat. No. 10,440,242.

(51) Int. Cl.

| | | |
|---|---|---|
| *B60R 11/04* | (2006.01) | |
| *G03B 17/02* | (2021.01) | |
| *G03B 29/00* | (2021.01) | |
| *H04N 23/00* | (2023.01) | |
| *H04N 23/55* | (2023.01) | |
| *H04M 1/02* | (2006.01) | |
| *H04N 23/57* | (2023.01) | |
| *H04N 23/54* | (2023.01) | |

(52) U.S. Cl.
CPC .............. *G03B 29/00* (2013.01); *H04N 23/00* (2023.01); *H04N 23/54* (2023.01); *H04N 23/55* (2023.01); *G03B 2217/002* (2013.01); *H04M 1/0264* (2013.01); *H04N 23/57* (2023.01)

(58) Field of Classification Search
CPC ...... H04N 5/2251; H04N 23/51; H04N 23/00; H04N 23/54; H04N 23/55; H04N 23/57; H04N 23/50; B60R 1/00; B60R 11/04; G03B 17/02; G03B 29/00; G03B 2217/002; G03B 30/00; H04M 1/0264
See application file for complete search history.

(56) References Cited

U.S. PATENT DOCUMENTS

| | | | | |
|---|---|---|---|---|
| 2006/0171704 | A1* | 8/2006 | Bingle | .................... B60R 11/04 396/419 |
| 2008/0278621 | A1 | 11/2008 | Cho et al. | |
| 2011/0298925 | A1* | 12/2011 | Inoue | ................... H04N 5/2254 348/148 |
| 2013/0027607 | A1* | 1/2013 | Jeon | ..................... H04N 5/2257 348/374 |

FOREIGN PATENT DOCUMENTS

| | | |
|---|---|---|
| CN | 102193160 A | 9/2011 |
| CN | 102611838 A | 7/2012 |
| CN | 107395925 A | 11/2017 |
| KR | 10-1070918 B1 | 10/2011 |
| KR | 10-2012-0003036 A | 1/2012 |
| KR | 10-2013-0007518 A | 1/2013 |
| KR | 10-2013-0013640 A | 2/2013 |
| KR | 10-2013-0047268 A | 5/2013 |
| KR | 10-1444024 B1 | 9/2014 |
| KR | 10-2015-0052075 A | 5/2015 |
| KR | 10-2015-0090661 A | 8/2015 |

OTHER PUBLICATIONS

International Search Report in International Application No. PCT/KR2016/009635, filed Aug. 30, 2016.
Office Action dated Jan. 23, 2019 in U.S. Appl. No. 15/756,443.
Notice of Allowance dated Jun. 5, 2019 in U.S. Appl. No. 15/756,443.
Office Action dated Dec. 3, 2020 in Chinese Application No. 201680050781.2.
Office Action dated Jul. 22, 2020 in U.S. Appl. No. 16/554,316.
Notice of Allowance dated Dec. 16, 2020 in U.S. Appl. No. 16/554,316.
Office Action dated Jun. 25, 2021 in Chinese Application No. 202010711985.4.
Office Action dated Jun. 18, 2021 in Korean Application No. 10-2015-0123531.

\* cited by examiner

CAMERA MODULE AND VEHICLE CAMERA

CROSS-REFERENCE TO RELATED APPLICATIONS

This application is a continuation of U.S. application Ser. No. 17/203,262, filed Mar. 16, 2021; which is a continuation of U.S. application Ser. No. 16/554,316, filed Aug. 28, 2019, now U.S. Pat. No. 10,979,606, issued Apr. 13, 2021; which is a continuation of U.S. application Ser. No. 15/756,443, filed Feb. 28, 2018, now U.S. Pat. No. 10,440,242, issued Oct. 8, 2019; which is the U.S. national stage application of International Patent Application No. PCT/KR2016/009635, filed Aug. 30, 2016, which claims priority to Korean Application No. 10-2015-0123531, filed Sep. 1, 2015, the disclosures of each of which are incorporated herein by reference in their entirety.

TECHNICAL FIELD

The teachings in accordance with exemplary and non-limiting embodiments of this invention relate generally to a camera module and a vehicle camera.

BACKGROUND ART

This section provides background information related to the present invention, which is not necessarily prior art.

Recently, vehicles mounted with a rear camera have been manufactured and sold in order to secure a driver's view to a rear side of a vehicle while the vehicle is backed up. Meantime, the vehicle camera mounted on a vehicle is provided in a state of being at least partially exposed to an outside, where the exposed area is exposed to high temperature, low temperature, high moisture and rains depending on changes in climate states, and therefore a tight sealing at inside of the vehicle camera is required.

Furthermore, the trend is that miniaturization of vehicle camera is required in order to reduce an installation space for the vehicle camera.

DETAILED DESCRIPTION OF THE INVENTION

Technical Subject

In order to solve the aforementioned problems, exemplary embodiments of the present invention provide a camera module adequate for miniaturization by arranging a plurality of area-reduced substrates in a stacked structure. Furthermore, exemplary embodiments of the present invention provide a camera module where an inner tight sealing can be maintained. Still furthermore, exemplary embodiments of the present invention provide a vehicle camera applied with the camera module, and a manufacturing method of the camera module.

Technical Solution

In one general aspect of the present invention, there is provided a camera module comprising:
a housing comprising a through hole;
a lens module disposed in the through hole;
a connector penetrating the housing and extending to an outside from an inside of the housing;
a first substrate unit located inside the housing and having an image sensor mounted thereon;
a second substrate unit disposed inside the housing and connected to the connector; and
a flexible substrate for electrically connecting the first substrate and the second substrate unit, wherein the flexible substrate is coupled to a lower surface of the first substrate unit and a side surface of the second substrate.

Preferably, but not necessarily, the first substrate unit may include a first substrate portion mounted at one surface with an image sensor, and mounted at the other surface with a first connecting port, and a second substrate portion including a second connecting port coupled to the first connecting port, and
the second substrate unit may include a third substrate portion connected with the second substrate portion through the flexible substrate and including a third connecting port, and a fourth substrate portion including a fourth connecting port coupled to the third connecting port and connected to the connector, wherein
the flexible substrate is coupled to a bottom surface of the second substrate portion and to a lateral surface of the third substrate portion.

Preferably, but not necessarily, the first substrate portion, the second substrate portion, the third substrate portion and the fourth substrate portion may be disposed in parallel.

Preferably, but not necessarily, the flexible substrate may have a shape of being bent thrice. Preferably, but not necessarily, the camera module may further comprise a first sealing member interposed between an outermost lens of a lens module and a lens barrel.

Preferably, but not necessarily, the housing may include an upper housing coupled by the lens module and a bottom housing penetrated by the connector, and a second sealing member may be disposed between the upper housing and the bottom housing.

Preferably, but not necessarily, the camera module may further comprise a third sealing member interposed between the connector and the housing.

Preferably, but not necessarily, the upper housing may include an EMI (Electro Magnetic Interference) shield can of metal material, wherein the EMI shield can may be grounded through a coupling member of metal material coupling the upper housing and the bottom housing.

Preferably, but not necessarily, the housing may include a first coupling hole, and the first substrate unit may include:
a second coupling hole disposed at the first substrate portion and to correspond to the first coupling hole;
a first support coupling part including a support portion having a third coupling hole, a first coupling hole extended from the support portion and a coupling part coupled to the second coupling hole;
a fourth coupling hole disposed at the second substrate portion and corresponding to the third coupling hole; and
a first coupling part coupled to the third coupling hole and to the fourth coupling hole.

Preferably, but not necessarily, the first substrate portion may include a guide hole, and the housing may include a guide lug protruded inwardly, and inserted into the guide hole to guide a coupling position of the first substrate portion.

Preferably, but not necessarily, the camera module may further comprise a plate coupled by the connector, wherein the fourth substrate portion may be connected to the connector by being accommodated into the plate.

Preferably, but not necessarily, the plate may include a fifth coupling hole, and the second substrate unit may include:

a sixth coupling hole disposed at the fourth substrate portion and to correspond to the fifth coupling hole;

a second support coupling part including a support portion having a seventh coupling hole, and a coupling portion extended from the support portion and coupled to the fifth coupling hole and the sixth coupling hole;

an eighth coupling hole disposed at the third substrate portion and to correspond to the seventh coupling hole; and a second coupling part coupled to the seventh coupling hole and the eighth coupling hole.

Preferably, but not necessarily, a substrate of the first substrate portion and a substrate of the second substrate portion may be spaced apart by 3-5 mm.

Preferably, but not necessarily, the coupling part may be coupled to the fifth coupling hole using a third fastening torque, and the second coupling part may be coupled to the seventh coupling hole using a fourth fastening torque greater than the third fastening torque.

In another general aspect of the present invention, there is provided a vehicle camera installed on a vehicle, wherein the vehicle camera comprises:

a housing comprising a through hole;

a lens module disposed in the through hole;

a connector penetrating the housing and extending to an outside from an inside of the housing;

a first substrate unit located inside the housing and having an image sensor mounted thereon;

a second substrate unit disposed inside the housing and connected to the connector; and a flexible substrate for electrically connecting the first substrate and the second substrate unit, wherein the flexible substrate is coupled to a lower surface of the first substrate unit and a side surface of the second substrate.

Advantageous Effects

Through the present invention, a camera module is provided that is secured with an inner tight sealing and adequate for miniaturization. Furthermore, the present invention provides a vehicle camera applicable with the camera module, and a manufacturing method of the camera module.

BEST MODE

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

Now, a configuration of a camera module according to an exemplary embodiment of the present invention will be described in detail with reference to the accompanying drawings.

Figure 1:
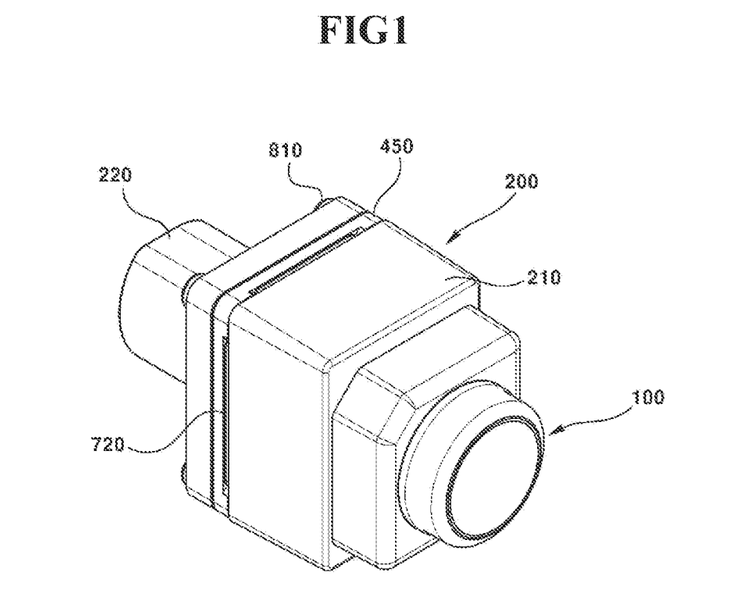
FIG. 1 is a perspective view of a camera module an exemplary embodiment of the present invention.
Figure 2:
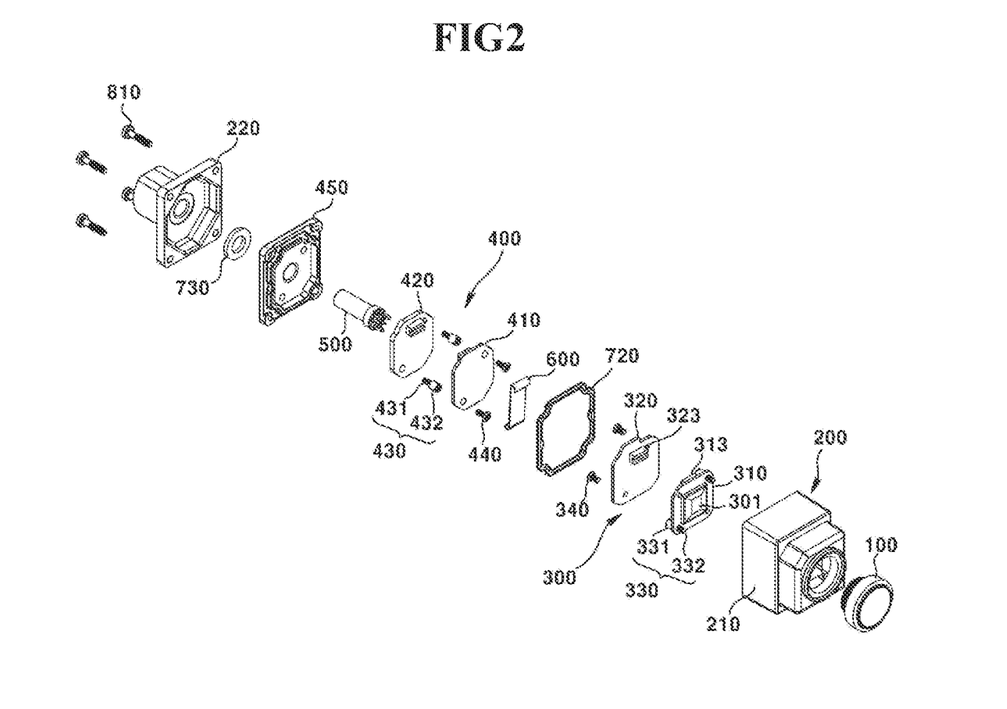
FIG. 2 is an exploded perspective view of a camera module according to an exemplary embodiment of the present invention.
Figure 3:
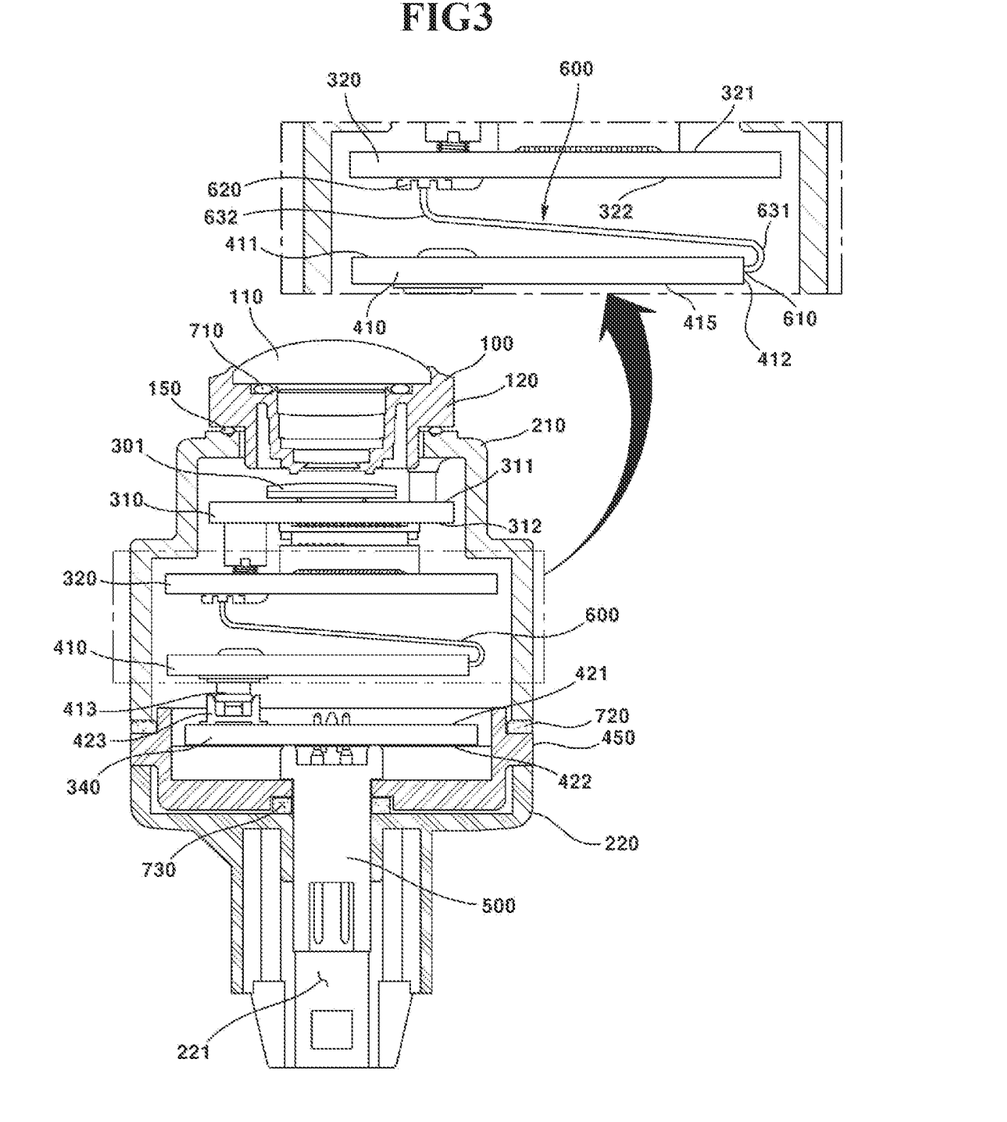
FIG. 3 is a cross-sectional view and a cross-sectional enlarged view of a camera module according to an exemplary embodiment of the present invention.
Figure 4:
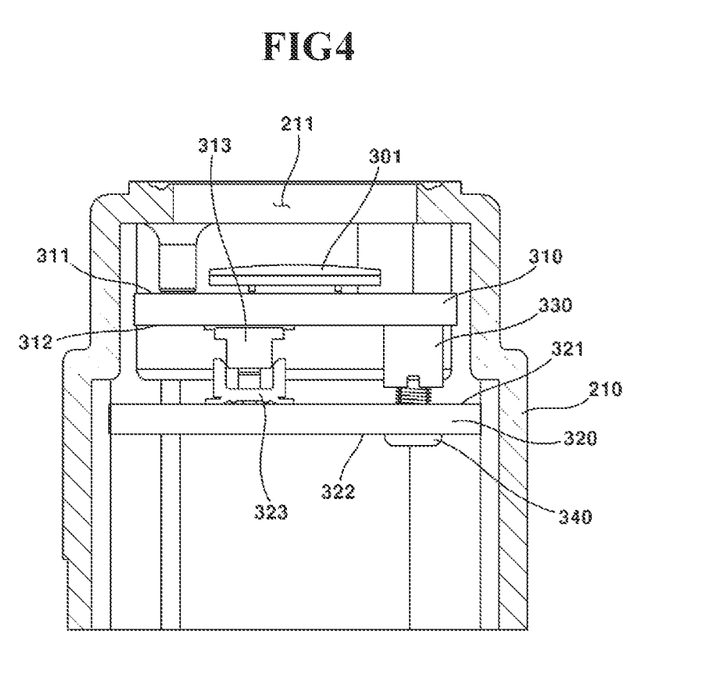
FIG. 4 is a partial cross-sectional view of camera module according to an exemplary embodiment of the present invention.
Figure 5:
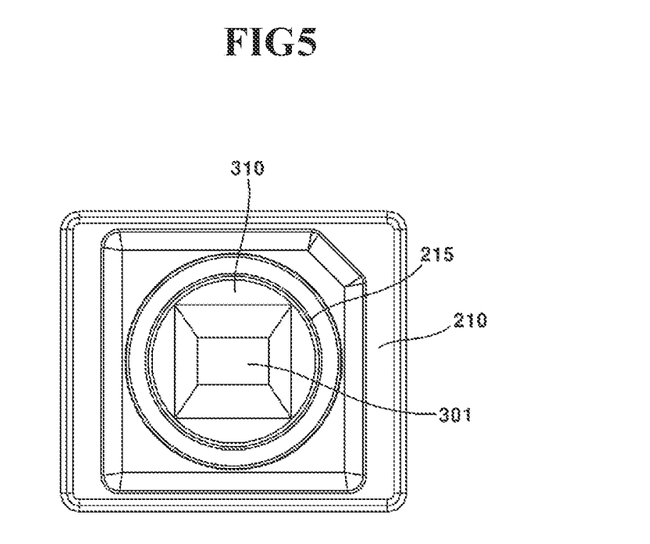
FIG. 5 is a plane view of a state where a lens module is removed from a camera module according to an exemplary embodiment of the present invention.
Figure 6A:
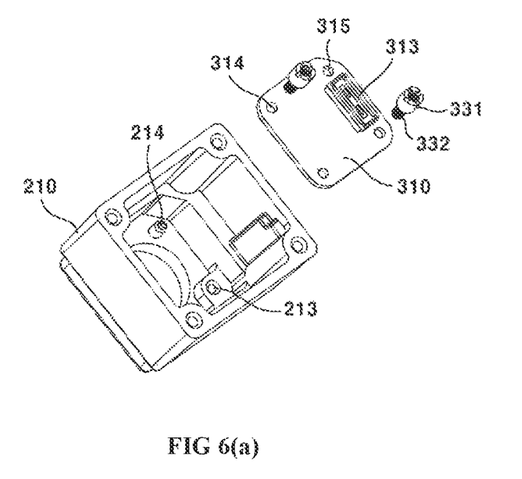
FIG. 6(a) is a schematic view of camera module before assembly of a first substrate portion.
Figure 6B:
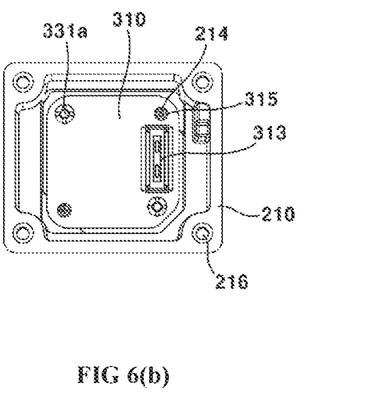
FIG. 6(b) is a schematic view of camera module after assembly of a first substrate portion according to an exemplary embodiment of the present invention.
Figure 7A:
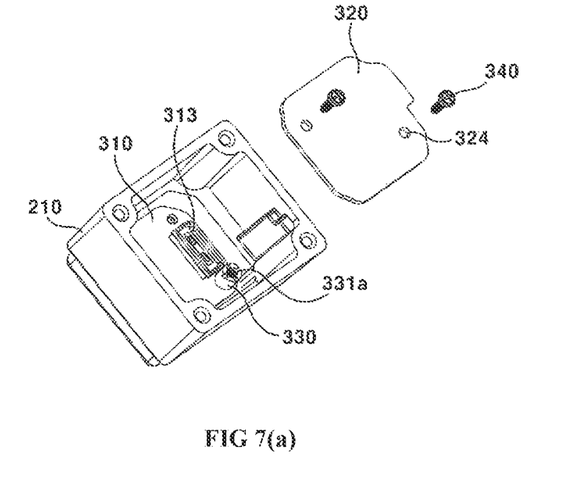
FIG. 7(a) is a schematic view of camera module before assembly of a second substrate portion.
Figure 7B:
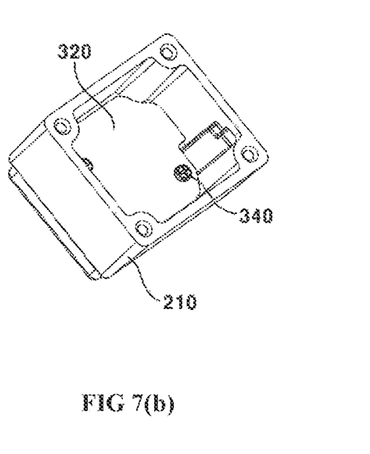
FIG. 7(b) is a schematic view of camera module after assembly of a second substrate portion according to an exemplary embodiment of the present invention.
Figure 8A:
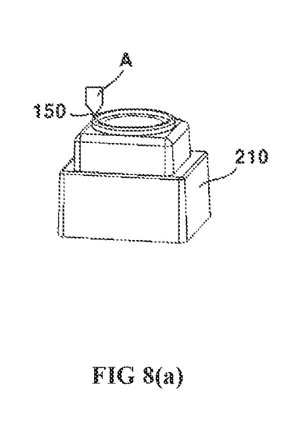
FIG. 8(a) is a schematic view illustrating coating of an adhesive for lens module assembly of a camera module.
Figure 8B:
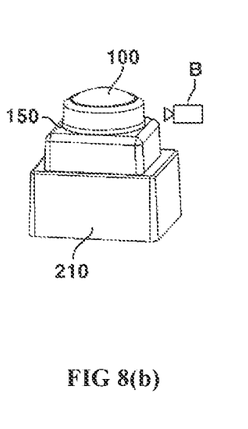
FIG. 8(b) is a schematic view illustrating adjusting an optical axis alignment between a lens module and an image sensor and curing an adhesive using UV rays.
Figure 8C:
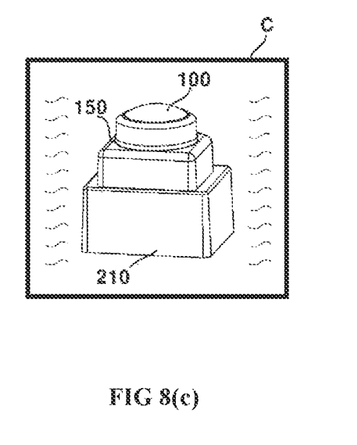
FIG. 8(c) is a schematic view illustrating curing of an adhesive in an oven according to an exemplary embodiment of the present invention.
Figure 9A:
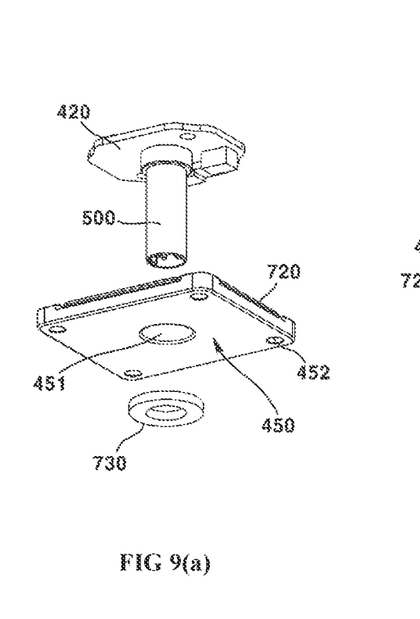
FIG. 9(a) is a schematic view of camera module before assembly of a fourth substrate portion.
Figure 9B:
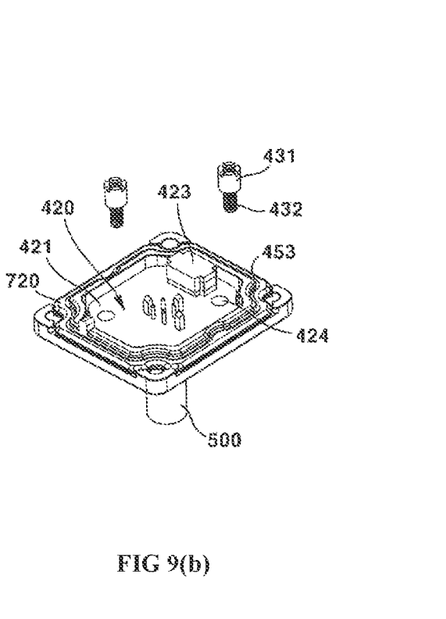
FIG. 9(b) is a schematic view of camera module after assembly of a fourth substrate portion according to an exemplary embodiment of the present invention.
Figure 10A:
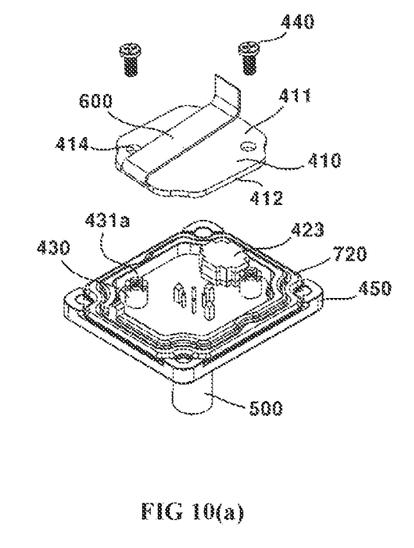
FIG. 10(a) is a schematic view of camera module before assembly of a third substrate portion.
Figure 10B:
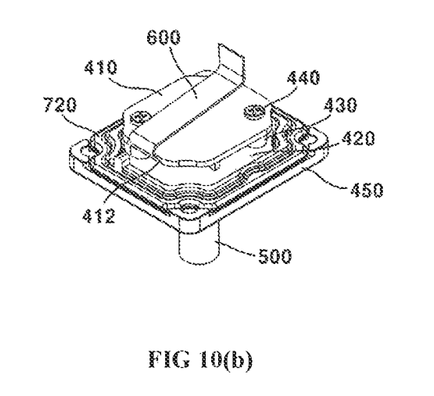
FIG. 10(b) is a schematic view of camera module after assembly of a third substrate portion according to an exemplary embodiment of the present invention.
Figure 11A:
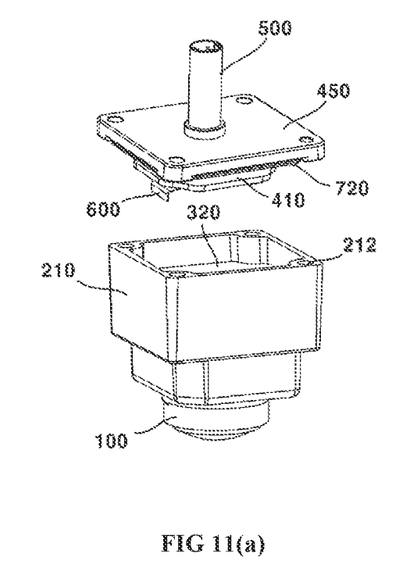
FIG. 11(a) is a schematic view of camera module before coupling of a second substrate portion and a third substrate portion.
Figure 11B:
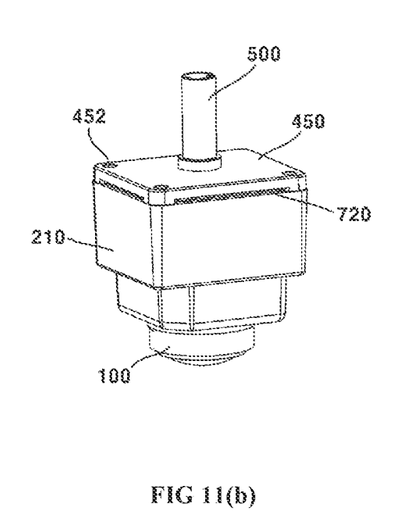
FIG. 11(b) is a schematic view of camera module after coupling of a second substrate portion and a third substrate portion according to an exemplary embodiment of the present invention.
Figures 12A, 12B:
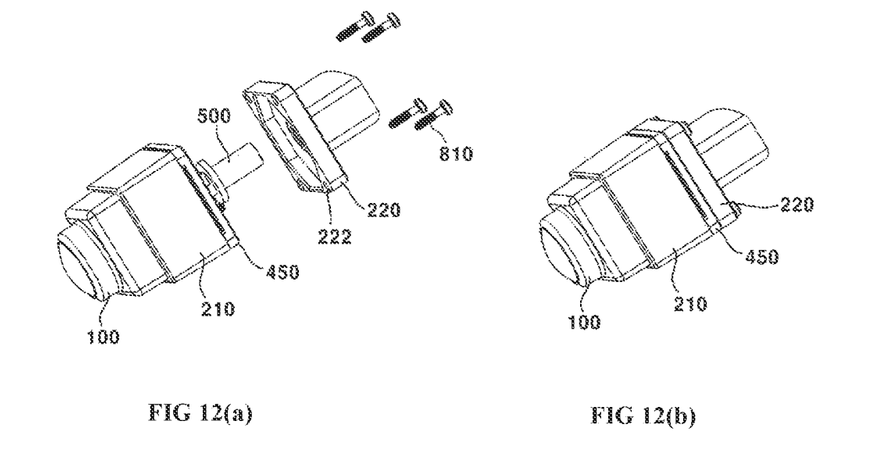
FIG. 12(a) is a schematic view of camera module before assembly of an upper housing and a bottom housing.
FIG. 12(b) is a schematic view of camera module after assembly of an upper housing and a bottom housing according to an exemplary embodiment of the present invention.
Figure 13:
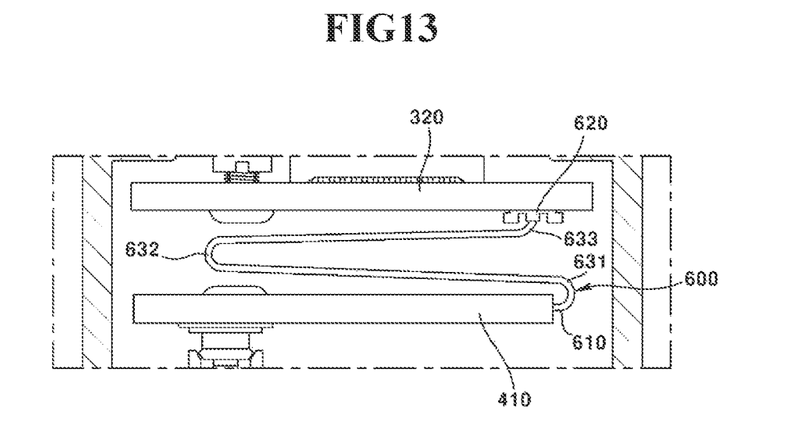
FIG. 13 is a modification of a flexing substrate in a camera module according to an exemplary embodiment of the present invention.
Figure 14A:
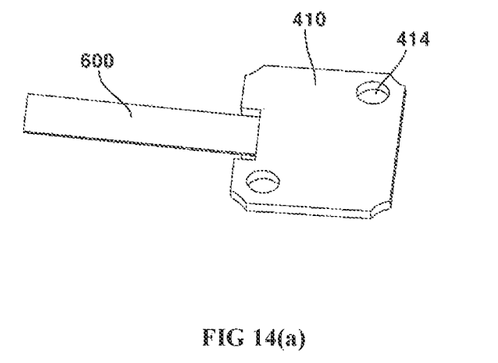
FIGS. 14(a) and 14(b) are another modification of a flexing substrate in a camera module according to an exemplary embodiment of the present invention.
Figure 14B:
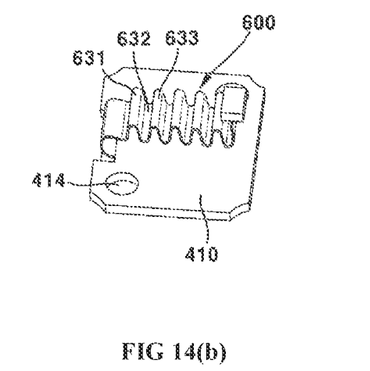

FIG. 1 is a perspective view of a camera module according to an exemplary embodiment of the present invention, FIG. 2 is an exploded perspective view of a camera module according to an exemplary embodiment of the present invention, FIG. 3 is a cross-sectional view and a cross-sectional enlarged view of a camera module according to an exemplary embodiment of the present invention, FIG. 4 is a partial cross-sectional view of camera module according to an exemplary embodiment of the present invention, FIG. 5 is a plane view of a state where a lens module is removed from a camera module according to an exemplary embodiment of the present invention, FIG. 6(a) is a schematic view of camera module before assembly of a first substrate portion, and FIG. 6(b) is a schematic view of camera module after assembly of a first substrate portion according to an exemplary embodiment of the present invention, FIG. 7(a) is a schematic view of camera module before assembly of a second substrate portion, and FIG. 7(b) is a schematic view of camera module after assembly of a second substrate portion according to an exemplary embodiment of the present invention, FIG. 8(a) is a schematic view illustrating coating of an adhesive for lens module assembly of a camera module, FIG. 8(b) is a schematic view illustrating adjusting an optical axis alignment between a lens module and an image sensor and curing an adhesive using UV rays, and FIG. 8(c) is a schematic view illustrating curing of an adhesive in an oven according to an exemplary embodiment of the present invention, FIG. 9(a) is a schematic view of camera module before assembly of a fourth substrate portion, and FIG. 9(b) is a schematic view of camera module after assembly of a fourth substrate portion according to an exemplary embodiment of the present invention, FIG. 10(a) is a schematic view of camera module before assembly of a third substrate portion, and FIG. 10(b) is a schematic view of camera module after assembly of a third substrate portion according to an exemplary embodiment of the present invention, FIG. 11(a) is a schematic view of camera module before coupling of a second substrate portion and a third substrate portion, and FIG. 11(b) is a schematic view of camera module after coupling of a second substrate portion and a third substrate portion according to an exemplary embodiment of the present invention, FIG. 12(a) is a schematic view of camera module before assembly of an upper housing and a bottom housing, and FIG. 12(b) is a schematic view of camera module after assembly of an upper housing and a bottom housing according to an exemplary embodiment of the present invention, FIG. 13 is a modification of a flexing substrate in a camera module according to an exemplary embodiment of the present invention, and FIGS. 14(a) and 14(b) are another modification of a flexing substrate in a camera module according to an exemplary embodiment of the present invention.

Referring to FIGS. 1-14(b), a camera module according to an exemplary embodiment of the present invention may include a lens module (100), a housing (200), a substrate unit (300, 400), a connector (500), a flexible substrate (600), a sealing member (710, 720, 730) and a coupling member (810). However, any one or more of the lens module (100), the housing (200), the substrate unit (300, 400), the connector (500), the flexible substrate (600), the sealing member (710, 720, 730) and the coupling member (810) may be omitted in the camera module according to an exemplary embodiment of the present invention.

The lens module (100) may be coupled to a through hole (211) the housing (200). Through this configuration, a light having passed the lens module (100) may be incident on an image sensor (301). The lens module (100) may include an outermost lens (110), and a lens barrel (120) accommodating the outermost lens (110). A first sealing member (710) may be interposed between the outermost lens (110) and the lens barrel (120) for tight sealing. Meantime, the lens barrel (120) may be accommodated with a plurality of lenses.

The lens module (100) and the housing (200) may be coupled by an adhesive. The housing (200) may be formed with an accommodation groove (215) to accommodate the adhesive. For example, the adhesive may be epoxy (150). That is, the lens module (100) and the housing (200) may be adhered by epoxy (150). At this time, the epoxy (150) may be cured by UV and heat. For example, the lens module (100) may be such that, while the epoxy (150) is coated between the lens module (100) and the housing (200), an optical axis alignment relative to an image sensor (301) is adjusted, and when the optical axis alignment is finished, the curing of epoxy (150) is progressed through the UV, and an actual curing can be progressed through heating.

The lens module (100) may be so formed as to be slanted at 1-1.5 degrees while being inserted into a through hole (211) of the housing (200). In this case, even if there is a manufacturing error, the housing (200) and a first substrate portion (310) the optical axis alignment between the lens module (100) and the image sensor (301) can be matched.

The housing (200) may form an inner space therein to accommodate the first substrate unit (300) and the second substrate unit (400) and to form an external look of the camera module. The housing (200) may substantially take a cubic shape and may have a staircase shape at an outside. However, the shape of the housing (200) is not limited thereto, and the housing may have various shapes such as a cylinder.

The housing (200) may include an upper housing (210) and a bottom housing (220). The housing (200) may include an upper housing (210) coupled by the lens module (100). The housing (200) may include a bottom housing (220) pierced by the connector (500).

The upper housing (210) and the bottom housing (220) may be coupled to form an inner space. For example, a plate (450) may be disposed between the upper housing (210) and the bottom housing (220).

The upper housing (210) may include an EMI (Electro Magnetic Interference) shield can of metal material. The EMI shield can may inhibit an electronic interference noise generated from outside of the housing (200) from entering an inside and may inhibit an electronic interference noise generated from inside of the housing (200) from entering an outside. The EMI (Electro Magnetic Interference) shield can may be grounded through a coupling member (810) of metal material that couples the upper housing (210) to the bottom housing (220). At this time, various grounding methods may be applied, and as an example, the EMI shield can and the coupling member (810) may be intercommunicated to allow the coupling member (810) to be connected to a ground end outside of the camera module and the ground can be realized. The upper housing (210), as illustrated in FIG. 6(b), may be formed with a coupling member fastening hole (216) coupled by the coupling member (810).

The upper housing (210) may include a through hole (211) coupled by the lens module (100). That is, the upper housing (210) may be coupled by the lens module (100). At this time, the lens module (100) may be coupled to the through hole (211) of the upper housing (210), and a light having passed the lens module (100) via the through hole (211) may reach the image sensor (301). That is, the through hole (211) and the image sensor (301) may be overlapped to an optical axis direction. Meantime, the shape of the through hole (211) may be round when viewed from an upper side, but the present invention is not limited thereto.

The upper housing (210) may be formed with a bottom end (212) at an opposite side of an upper surface coupled by the lens module (100). The bottom end (212) of the upper housing (210) may be coupled by an upper end (222) of the bottom housing (220), and for example, a plate (450) may be disposed therebetween. The bottom end (212) of the upper housing (210) may be disposed with a second sealing member (720). Meantime, the bottom end (212) of the upper housing (210) may be disposed with an accommodating groove (not shown) accommodating at least a part of the second sealing member (720).

The upper housing (210) may include a first coupling hole (213). The first coupling hole (213) may be coupled by a coupling part (332) of a first support coupling part (330), whereby the first substrate portion (310) may be fixed to an inside of the upper housing (210).

For example, the first coupling hole (213) may be formed with a shape and a size corresponding to those of a second coupling hole (314). Furthermore, as a modification, the first coupling hole (213) may be formed smaller in size than the second coupling hole (314). For example, an inner surface of the first coupling hole (213) may be formed with screw threads. The screw threads may be coupled by being fastened of screw threads of the coupling portion (332) at the first support coupling part (330).

The upper housing (210) may include a guide lug (214) inwardly protruded and inserted into a guide hole (315) and to guide a coupling position of the first substrate portion (310). The guide lug (214) may have a shape corresponding to that of a guide hole (315) of the first substrate portion (310). The guide lug (214) may be of a cylinder shape, for example, but the present invention is not limited thereto. The guide lug (214) may have a diameter smaller than that of the guide hole (315), for example, but the present invention is not limited thereto.

The bottom housing (220) may include a through hole (221) to be passed by the connector (500). The through hole (221) may have a shape corresponding to that of the connector (500). Meantime, a diameter of the through hole (221) may be greater than that of the connector (500). For example, a third sealing member (730) may be interposed between the through hole (221) and the connector (500)

The bottom housing (220) may be coupled, at an upper end (222), to the upper housing (210) or the plate (450). Thus, a sealing member may be disposed between the upper end (222) of the bottom housing (220) and a bottom end (212) of the upper housing (210), or between the upper end (222) of the bottom housing (220) and the plate (450).

The first substrate unit (300) may be disposed at an inside of the housing (200). The first substrate unit (300) may be mounted with an image sensor (301). The image sensor (301) may be so disposed as to match to the lens module (100) in terms of optical axis. Through this configuration, the image sensor (301) can obtain a light having passed the lens module (100). The image sensor (301) can output an irradiated light as an image. The image sensor (301) may be a CCD (charge coupled device), an MOS (metal oxide semi-conductor), CPD and CID. However, the types of image sensor are not limited thereto.

The first substrate unit (300) may include a first substrate portion (310), a second substrate portion (320), a first support coupling part (330) and a first fastening part (340).

The first substrate unit (300) may include a first substrate portion (310) mounted at an upper surface (311) with the image sensor (301), and including a first connecting port (313) disposed at a bottom surface. The first substrate unit (300) may include a first connecting port (313), a second coupling hole (314) and a guide hole (315).

The first connecting port (313) may be disposed at a bottom surface (312) of the first substrate portion (310) and may be coupled to a second connecting port (323) of the second substrate portion (320). Thus, the coupling between the first connecting port (313) and the second connecting port (323) may be called a 'connector to connector' coupling. The first connecting port (313) may take any shape and any structure as long as the first connecting port (313) is electrically conducted while being coupled to the second connecting port (323).

The second coupling hole (314) may be formed at a position corresponding to that of the first coupling hole (213). Meantime, the second coupling hole (314) may take a shape corresponding to that of the first coupling hole (213).

The second coupling hole (314) may be coupled with a coupling portion (332) of the first support coupling part (330). For example, the coupling portion (332) may be coupled to the second coupling hole (314). In another example, the coupling portion (332) may not be coupled to the second coupling hole (314), but may be coupled only to the first coupling hole (213). For example, an inner circumferential surface of the second coupling hole (314) may be formed with screw threads. In another example, the inner circumferential surface of the second coupling hole (314) may not be formed with a coupling structure like screw threads. At this time, a diameter of the second coupling hole (314) may be greater than that of the first coupling hole (213). The second coupling hole (314) may be adjacently formed to two corner portions out of four corner portions at the first substrate portion (310). However, the present invention is not limited thereto. At this time, two corner portions may be disposed to a diagonal direction. Furthermore, a guide hole (315) may be disposed adjacent to the remaining two corner portions.

The guide hole (315) may be inserted by a guide lug (214) protruding from a bottom surface of the upper housing (210) to a bottom side. The guide hole (315) may be formed in a shape and a size corresponding to those of the guide lug (214). Through this configuration, when the guide lug (214) is inserted into the guide hole (315), the first substrate portion (310) may be disposed at a right, appropriate position at an inner side of the upper housing (210). That is, the guide lug (214) and the guide hole (315) may guide the coupling between the first substrate portion (310) and the upper housing (210).

The first substrate unit (300) may include a second substrate portion (320) including a second connecting port (323) coupling with the first connecting port (313). The second substrate portion (320) may be installed in parallel with the first substrate portion (310). The upper surface (321) of the second substrate portion (320) may face a bottom surface (312) of the first substrate portion (310). Furthermore, the bottom surface (322) of the second substrate portion (320) may face an upper surface (411) of the third substrate portion (410). The second substrate portion (320) may be connected to the first substrate portion (310) through the second connecting port (323) disposed at the upper surface (321), and may be connected to flexible substrate (600) to thereby be connected to the third substrate portion (410).

The second substrate portion (320) may include a second connecting port (323) and a fourth coupling hole (324).

The second connecting port (323) may be disposed at an upper surface (321) of the second substrate portion (320), and may be coupled to the first connecting port (313) of the first substrate portion (310). The second connecting port (323) may be electrically conductive by being coupled to the first connecting port (313), and shape and structure thereof is not limited thereto.

The fourth coupling hole (324) may be disposed at the second substrate portion (320) and may correspond to a third coupling hole (331*a*). The fourth coupling hole (324) may be formed at a position corresponding to that of the third coupling hole (331*a*).

Meantime, the fourth coupling hole (324) may take a shape corresponding to that of the third coupling hole (331*a*). The fourth coupling hole (324) may be coupled by a first fastening part (340). In one example, the first fastening part (340) may be coupled to the fourth coupling hole (324). In another example, the first fastening part (340) may not be coupled to the fourth coupling hole (324), but may be coupled only to the third coupling hole (331*a*). In one example, an inner circumferential surface of the fourth coupling hole (324) may be formed with screw threads. In another example, the inner circumferential surface of the fourth coupling hole (324) may not be formed with a coupling structure like the screw threads. At this time, a diameter of the fourth coupling hole (324) may be greater than that of the third coupling hole (331*a*). The fourth coupling hole (324) may be adjacently formed to two corner portions out of four corner portions at the second substrate portion (320). However, the present invention is not limited thereto. At this time, two corner portions may be disposed to a diagonal direction.

The first substrate unit (300) may include a first support coupling part (330) fixing the first substrate portion (310) to the upper housing (210) and maintaining a coupling gap between the first substrate portion (310) and the second substrate portion (320). The first substrate unit (300) may include a support portion (331) having a third coupling hole (331*a*), and a coupling portion (332) extended from the support portion (331) and coupled to the first coupling hole (213) and the second coupling hole (314).

The first support coupling part (330) may include a support portion (331) and a coupling portion (332).

The support portion (331) may be formed with a diameter greater than that of the coupling portion (332). Through this configuration, the support portion (331) may support the first substrate portion (310) and the second substrate portion (320) by spacing the first substrate portion (310) and the second substrate portion (320) apart at a predetermined distance. A height of the support portion (331) may be 3 mm~5 mm, for example. That is, a substrate of the first substrate portion (310) and a substrate of the second substrate portion (320) may be disposed while being spaced apart at a 3 mm~5 mm distance. At this time, when a distance between the substrate of the first substrate portion (310) and the substrate of the second substrate portion (320) is shorter than 3 mm, there may be generated a problem because of parts mounted on the upper surface 9321) of the second substrate portion (320) contacting the first substrate portion (310), and when a distance between the substrate of the first substrate portion (310) and the substrate of the second substrate portion (320) is longer than 5 mm, there may be generated a difficulty in connector connection through the first connecting port (313) and the second connecting port (323). The support portion (331) may include, at an inner side, a third coupling hole (331*a*). At this time, an inner circumferential surface of the support portion (331) forming the third coupling hole (331*a*) may be formed with screw threads. The screw threads may be coupled and fastened by screw threads of the first fastening part (340). A distance between the substrate of the first substrate portion (310) and the substrate of the second substrate portion (320) may be 4 mm.

The coupling portion (332) may be coupled to the first coupling hole (213) by being extended from the support portion (331). An outer circumferential surface of the coupling portion (332) may be formed with screw threads, and a coupling between the coupling portion (332) and the first coupling hole (213) may be implemented by screw-connection. For example, the coupling portion (332) may be coupled to the second coupling hole (314). In another example, the coupling portion (332) may not be coupled by the second coupling hole (314) but may go therethrough.

The first substrate unit (300) may include a first fastening part (340) coupled to the third coupling hole (331*a*) and the fourth coupling hole (324). However, the first fastening part (340) may be fastened only to the third coupling hole (331*a*), but may go through the fourth coupling hole (324). An outer circumferential surface of the first fastening part (340) may be formed with screw threads, and coupling between the third coupling hole (331*a*) and the first fastening part (340) may be implemented by screw-connection.

In the present exemplary embodiment, the coupling portion (332) may be coupled to the first coupling hole (213) by a first fastening torque, and the first fastening part (340) may be coupled to the third coupling hole (331*a*) by a second fastening torque. At this time, the first fastening torque may be greater than the second fastening torque. In this case, an unintentional release of coupling between the coupling portion (332) of the first support coupling part (330) and the first coupling hole (213) may be inhibited in the process of releasing the coupling between the first fastening part (340) and the third coupling hole (331*a*).

The second substrate unit (400) may be disposed at an inside of the housing (200). That is, the housing (200) may accommodate the second substrate unit (400) at an inside. The shape of the second substrate unit (400) may be so formed as to correspond to that of an inner space of the housing (200). The second substrate unit (400) may be connected to the connector (500). The second substrate unit (400) may receive a current from an outside power source of the camera module through the connector power (500). Furthermore, the second substrate unit (400) may transmit an image obtained from the image sensor (301) mounted on the first substrate unit (300) through the connector (500) to outside of the camera module.

The second substrate unit (400) may include a third substrate portion (410), a fourth substrate portion (420), a second support coupling part (430), a second fastening part (440) and a plate (450).

The second substrate unit (400) may be connected to the second substrate portion (320) through the flexible substrate (600), and may include a third substrate portion (410) having a third connecting port (413). The third substrate portion (410) may be electrically connected to the second substrate portion (320) through the flexible substrate (600). The third substrate portion (410) may be electrically connected to the fourth substrate portion (420) through the third connecting port (413). An upper surface (411) of the third substrate portion (410) may face a bottom surface of the second substrate portion (420). A lateral surface (412) of the third substrate portion (410) may be connected to the flexible substrate (600). Furthermore, the third substrate portion (410) may be connected at an upper surface (411) to the flexible substrate (600). The bottom surface (415) of the third substrate portion (410) may be disposed with the third connecting port (413). A bottom surface (415) of the third substrate portion (410) may face an upper surface (421) of the fourth substrate portion (420).

The third substrate portion (410) may be disposed by being spaced apart from the second substrate portion (320) at a distance of 4.8 mm. The third substrate portion (410) may be disposed by being spaced apart from the second substrate portion (320) at a distance of 3 mm~6 mm. The third substrate portion (410) and the second substrate portion (320) are connected by the flexible substrate (600), such that there is an advantage of being less in restriction on discrete distance over the coupling using the connecting port.

The third substrate portion (410) may include a third connecting port (413) and an eighth coupling hole (414).

The third connecting port (413) may be disposed at a bottom surface (415) of the third substrate portion (410) and may be coupled to the fourth connecting port (423) of the fourth substrate portion (420). The third connecting port (413) may be coupled to the fourth connecting port (423) for electrical conduction, and the shape and structure thereof are not limited.

The eighth coupling hole (414) may be disposed at the third substrate portion (410) to correspond to a seventh coupling hole (431*a*). The eighth coupling hole (414) may be formed at a position correspond to that of the seventh coupling hole (431*a*). Meantime, the eighth coupling hole (414) may have a shape corresponding to that of the seventh coupling hole (331*a*). The eighth coupling hole (414) may be coupled by a second coupling part (440). For example, the second coupling part (440) may be coupled to the eighth coupling hole (414). In another example, the second coupling part (440) may not be coupled to the eighth coupling hole (414) but may be coupled only to the seventh coupling hole (431*a*).

For example, an inner circumferential surface of the eighth coupling hole (414) may be formed with screw threads. In another example, an inner circumferential surface of the eighth coupling hole (414) may be not formed a coupling structure like the screw threads. At this time, a diameter of the eighth coupling hole (414) may be greater than that of the seventh coupling hole (431*a*). The eighth coupling hole (414) may be formed adjacent to two corner portions out of four corner portions of the third substrate portion (410), but the present invention is not limited thereto. At this time, two corner portions may be disposed to a diagonal direction.

The second substrate unit (400) man include a fourth connecting port (423) coupled to the third connecting port (413), and may include a fourth substrate portion (420) coupled to the connector (500). The fourth substrate portion (420) may be electrically coupled to the third substrate portion (410) by coupling between the third connecting port (413) and the fourth connecting port (423). Furthermore, the fourth substrate portion (420) may be electrically connected to the connector (500) by direct coupling.

In the present exemplary embodiment, the first substrate portion (310) and the second substrate portion (320), and the third substrate portion (410) and the fourth substrate portion (420) may be directly coupled by connecting ports (313, 323, 413, 423), and the second substrate portion (320) and the third substrate portion (410) may be coupled by the flexible substrate (600). Through this structure, the first substrate portion (310) to the fourth substrate portion (420) can be electrically conducted. At this time, the fourth substrate portion (420) may be electrically conducted with an outside power source of the camera module or a controller by being connected to the connector (500). That is, the first substrate portion (310) to the fourth substrate portion (420) may receive a current by being electrically conducted with an outside power source of the camera module or a controller and transmit/receive information or a control command.

Meantime, as a modification, the first substrate portion (310) and the second substrate portion (320) may be coupled by the flexible substrate (600), and the second substrate portion (320) to fourth substrate portion (420) may be coupled by the connecting port. Furthermore, in another modification, the third substrate portion (410) and the fourth substrate portion (420) may be coupled by the flexible substrate (600), and the first substrate portion (310) to the third substrate portion (410) may be coupled by the connecting port. Furthermore, this description does not limit the number of substrates formed in the present invention, and as long as the number of substrates is more than two, the coupling by connecting port or flexible substrate, which is a coupling structure between the substrate portions, may be applied. Furthermore, only one substrate portion may be formed.

The first substrate portion (310), the second substrate portion (320), the third substrate portion (410) and the fourth substrate portion (420) may be disposed in parallel. A bottom surface (312) of the first substrate portion (310) may face an upper surface (321) of the second substrate portion (320), a bottom surface (322) of the second substrate portion (320) may face an upper surface (411) of the third substrate portion (410), and a bottom surface (415) of the third substrate portion (410) may face an upper surface (421) of the fourth substrate portion (420).

An upper surface (421) of the fourth substrate portion (420) may face a bottom surface (415) of the third substrate portion (410). The upper surface (421) of the fourth substrate portion (420) may be disposed with a fourth connecting port (423). A bottom surface (422) of the fourth substrate portion (420) may be coupled by the connector (500). The fourth substrate portion (420) may be accommodated into the plate (450) to be connected with the connector.

The fourth substrate portion (420) may include a fourth connecting port (423) and a sixth coupling hole (424).

The fourth connecting port (423) may be disposed at an upper surface (421) of the fourth substrate portion (420), and may be coupled to the third connecting port (413) of the third substrate portion (410). The fourth connecting port (423) may be electrically conducted by being coupled to the third connecting port (413), and shape and structure of the fourth connecting port are not limited.

A sixth coupling hole (424) may be formed at a position corresponding to that of the fifth coupling hole (not shown). Meantime, the sixth coupling hole (424) may have a shape corresponding to that of the fifth coupling hole. The sixth coupling hole (424) may be coupled by a coupling portion (432) of a second support coupling part (430). For example, the coupling portion (432) may be coupled to the sixth coupling hole (424). In another example, the coupling portion (432) may not be coupled to the sixth coupling hole (424), and may be coupled only to the fifth coupling hole. As an example, an inner circumferential surface of the sixth coupling hole (424) may be formed with screw threads. As another example, the inner circumferential surface of the sixth coupling hole (424) may not be formed with a coupling structure like the screw threads. At this time, a diameter of the sixth coupling hole (424) may be greater than that of the fifth coupling hole. Although the sixth coupling hole (424) may be adjacently formed to two corner portions out of four corner portions of the fourth substrate portion (420), the present invention is not limited thereto. At this time, the two corner portions may be formed to a diagonal direction.

The second substrate unit (400) man include a second support coupling part (430) including a support portion (431) having a seventh coupling hole (431a) and a coupling portion (432) extended from the support portion (431) and coupled to the fifth coupling hole and the sixth coupling hole (432).

The second support coupling part (430) may include a support portion (431) and a coupling portion (432).

The support portion (431) may be formed with a diameter greater than that of the coupling portion (432). Through this structure, the support portion (431) may support the third substrate portion (410) and the fourth substrate portion (420) with a discrete distance therebetween. A height of the support portion (431) may be 3 mm~5 mm, for example. That is, a substrate of the third substrate portion (410) and a substrate of the fourth substrate portion (420) may be spaced apart at 3 mm~5 mm. The discrete distance between the substrate of the third substrate portion (410) and the substrate of the fourth substrate portion (420) may be applicable to an explanation about the discrete distance between the substrate of the first substrate portion (310) and the substrate of the second substrate portion (320). The support portion (431) may include, at an inner side, a seventh coupling hole (431a). At this time, an inner circumferential surface of the support portion (431) forming the seventh coupling hole (431a) may be formed with screw threads. The screw threads may be coupled and fastened by screw threads of second coupling part (440).

The coupling portion (432) may be extended from the support portion (431) to be coupled to the fifth coupling hole. An outer circumferential surface of the coupling portion (432) may be formed with screw threads, and coupling between the coupling portion (432) and the fifth coupling hole may be implemented by screw connection. For example, the coupling portion (432) may be coupled to the sixth coupling hole (424). In another example, the coupling portion (432) may not be fastened to the sixth coupling hole (424) and may pass through the sixth coupling hole.

The second substrate unit (400) may include a second fastening part (440) coupled to a seventh coupling hole (431a) and an eighth coupling hole (414). However, the second coupling part (440) may be coupled only to the seventh coupling hole (431a) and may pass through the eighth coupling hole (414). An outer circumferential surface of the second fastening part (440) may be formed with screw threads, and coupling between the second fastening part (440) and the seventh coupling hole (431a) may be implemented by screw connection.

In the present exemplary embodiment, the coupling portion (432) may be coupled to the fifth coupling hole by using a third fastening torque, and the second fastening part (440) may be coupled to the seventh coupling hole (431a) by using a fourth fastening torque. At this time, the third fastening torque may be greater than the fourth fastening torque. In this case, unintentional release of coupling between the coupling portion (432) of the second support coupling part (430) and the fifth coupling hole in the process of releasing the coupling between second coupling part (440) and the seventh coupling hole (431a) can be inhibited.

The second substrate unit (400) may include a plate (450) having a fifth coupling hole. The plate (450) may include a fifth coupling hole (not shown). The fifth coupling hole may be coupled by a coupling portion (432) of the second support coupling part (430). The plate (450) may include a through hole (451) through which the connector (500) can pass. The plate (450) may accommodate the fourth substrate portion (420). The plate (450) may guide a coupling between the accommodated fourth substrate portion (420) and the connector (500). The plate (450) may be formed with a coupling member fastening hole (452) through which a coupling member (810) coupling the upper housing (210), the plate (450) and the bottom housing (220) can pass or can be coupled. The plate (450) may be interposed between the upper housing (210) and the bottom housing (220). The plate (450) may be disposed with a second sealing member (720). The plate (450) may include a sealing member accommodating groove (453) in which the second sealing member (720) is accommodated. The sealing member accommodating groove (453) may be so formed as to correspond to the second sealing member (720) in terms of shape.

The connector (500) may be extended from inside of the housing (200) to an outside. The connector (500) may pass through the housing (200). The connector (500) can connect an outside element of camera module to the second substrate unit (400). Meantime, the first substrate unit (300) may be electrically connected to the second substrate unit (400) to be electrically connected to an outside. That is, the first substrate unit (300) and the second substrate unit (400) are supplied with a power through the connector (500), and information or control command may be transmitted and/or received. The connector (500) may be coupled to the plate (450). The connector (500) may be directly coupled to the fourth substrate portion (420). The connector (500) may take a cylindrical shape, for example, but the shape is not limited thereto.

The flexible substrate (600) can connect the first substrate unit (300) and the second substrate unit (400). The first substrate unit (300) and the second substrate unit (400) may be connected through the flexible substrate (600). The flexible substrate (600) may be an FPCB (Flexible Printed Circuit Board), for example.

The flexible substrate (600) may connect the third substrate portion (410) and the second substrate portion (320). The flexible substrate (600) may include a first connecting portion (610) connected to the third substrate portion (410) and a second connecting portion (620) connected to the second substrate portion (320).

The flexible substrate (600) may be bent twice as illustrated in FIG. 3, for example. That is, as illustrated in FIG. 3, the flexible substrate (600) may include a first bent portion (631) and a second bent portion (632). The first bent portion (631) can be bent close to 180°. The first bent portion (631) may be so bent as to have an obtuse angle. The second bent portion (632) may be bent close to 90°. The second bent portion (632) may be so bent as to have an obtuse angle. Although each of the first bent portion (631) and the second bent portion (632) is configured to have an obtuse angle in the present exemplary embodiment, the first bent portion (631) may be so bent as to be close to 180°, and the second bent portion (632) may be so bent as to be close to 90°. That is, the first bent portion (631) may be more bent than the second bent portion (632). The first bent portion (631) may be bent with a larger angle than the second bent portion (632).

The flexible substrate (600) may be coupled to a lateral surface of the third substrate portion (410). The flexible substrate (600) may be extended from a lateral surface of the third substrate portion (410). The flexible substrate (600) may be coupled to a bottom surface of the second substrate portion (320). The flexible substrate (600) may be extended from a bottom surface of the second substrate portion (320).

As a modification, the flexible substrate (600) may take a shape of being bent three or more times as illustrated in FIG. 13. The flexible substrate (600) may include a first bent portion (631), a second bent portion (632) and a third bent portion (633) as illustrated in FIG. 13. In this case, a phenomenon of the coupling between the flexible substrate (600) and the second substrate portion (320) being released can be reduced over a case where the flexible substrate (600) is bent twice. The reason is that, although a force to spread to an outside is applied to the second connecting portion (620), which is a coupling portion between the flexible substrate (600) and the second substrate portion (320) when the flexible substrate (600) is bent twice, a force to move toward an upper side is applied to the second connecting portion (620) when the flexible substrate (600) is bent three times.

However, the first bent portion (631) and the second bent portion (632) may be bent close to 180°. The first bent portion (631) and the second bent portion (632) may be so bent as to have an obtuse angle. The third bent portion (633) may be bent close to 90°. The third bent portion (633) may be so bent as to have an obtuse angle. Although each of the first bent portion (631), the second bent portion (632) and the third bent portion (633) is configured to have an obtuse angle according to the present exemplary embodiment, the first bent portion (631) and the second bent portion (632) may be so formed as to have an angle close to 180°, and the third bent portion (633) may be so faulted as to have an angle close to 90°. That is, the first bent portion (631) and the second bent portion (632) may be more bent than the third bent portion (633). The first bent portion (631) and the second bent portion (632) may be bent with an angle larger than the third bent portion (633).

As another modification, the flexible substrate (600) may take an unevenness (凹凸) shape, as illustrated in FIGS. 14(*a*) and 14(*b*). In comparison with the previous modification, the flexible substrate (600) may be explained as having been bent more than four times. That is, the said another modification of the flexible substrate (600) may also include a first bent portion (631), a second bent portion (632) and a third bent portion (633). FIG. 14(*a*) illustrates a state of the flexible substrate (600) coupled to the third substrate portion (410) prior to being bent, and FIG. 14(*b*) illustrates a state of the flexible substrate (600) after being bent. Even if the flexible substrate (600) is formed with an unevenness (凹凸) shape, the phenomenon of the coupling between the flexible substrate (600) and the second substrate portion (320) being released can be reduced over a case where the flexible substrate (600) is bent twice.

The bent portion of the flexible substrate (600) may be formed to be round, for example. Furthermore, in another example, the bent portion of the flexible substrate (600) may be formed to be angled. The bent portion of the flexible substrate (600) may be in a state of losing a restoring force that tends to restore to an initial state after being bent. The bent portion of the flexible substrate (600) may have a restoring force different from that of a portion where no bending is formed. The bent portion of the flexible substrate (600) may be formed by being bent more than once by an external force.

Although the present exemplary embodiment has explained that there are three sealing members (710, 720, 730), the number of sealing members (710, 720, 730) is not limited thereto. That is, one of two of the first to third sealing members (710, 720, 730) may be omitted and additional sealing members may be further formed. For example, an additional sealing member may be formed between the plate (450) and the bottom housing (220). The first sealing member (710) may be disposed between the outermost lens (110) of lens module (100) and the lens barrel (120). The second sealing member (720) may be disposed between the upper housing (210) and the bottom housing (220). The third sealing member (730) may be disposed between the connector (500) and the housing (200). The sealing members (710, 720, 730) may be an O-ring, but are not limited thereto. The sealing members (710, 720, 730) can maintain a tight seal inside a camera module of vehicle camera that is exposed to an external environment.

A coupling member (810) can couple the upper housing (210) and the bottom housing (220). The coupling member (810) can couple the upper housing (210), the plate (450) and the bottom housing (220). The coupling member (810) may be coupled to a coupling member fastening hole (216) of the upper housing (210), a coupling member fastening hole (452) of the plate (450) and a coupling member fastening hole of the bottom housing (220). The coupling member (810) may be coupled to the coupling member fastening holes (216, 452) by screw-connection, but the present invention is not limited thereto. The coupling member (810) can ground the EMI shield can by being electrically connected to an EMI shield can of the upper housing (210) and an outside ground terminal.

Hereinafter, a manufacturing method of the camera module according to exemplary embodiments will be described in detail with reference to the accompanying drawings.

FIG. 6(*a*) is a schematic view of camera module before assembly of a first substrate portion, and FIG. 6(*b*) is a schematic view of camera module after assembly of a first substrate portion according to an exemplary embodiment of the present invention, FIG. 7(*a*) is a schematic view of camera module before assembly of a second substrate portion, and FIG. 7(*b*) is a schematic view of camera module after assembly of a second substrate portion according to an exemplary embodiment of the present invention, FIG. 8(*a*) is a schematic view illustrating coating of an adhesive for lens module assembly of a camera module, FIG. 8(*b*) is a schematic view illustrating adjusting an optical axis alignment between a lens module and an image sensor and curing an adhesive using UV rays, and FIG. 8(*c*) is a schematic view illustrating curing of an adhesive in an oven according to an exemplary embodiment of the present invention, FIG. 9(*a*) is a schematic view of camera module before assembly of a fourth substrate portion, and FIG. 9(*b*) is a schematic view of camera module after assembly of a fourth substrate portion according to an exemplary embodiment of the present invention, FIG. 10(*a*) is a schematic view of camera module before assembly of a third substrate portion, and FIG. 10(*b*) is a schematic view of camera module after assembly of a third substrate portion according to an exemplary embodiment of the present invention, FIG. 11(*a*) is a schematic view of camera module before coupling of a second substrate portion and a third substrate portion, and FIG. 11(*b*) is a schematic view of camera module after coupling of a second substrate portion and a third substrate portion according to an exemplary embodiment of the present invention, FIG. 12(a) is a schematic view of camera module before assembly of an upper housing and a bottom housing, and FIG. 12(b) is a schematic view of camera module after assembly of an upper housing and a bottom housing according to an exemplary embodiment of the present invention.

First, referring to FIGS. 6(a) and 6(b), the first substrate portion (310) is coupled to the upper housing (210). To be more specific, the guide lug (214) of the upper housing (210) is positioned into the guide hole (315) of the first substrate portion (310) to match the second coupling hole (314) to the first coupling hole (213). Then, the coupling portion (332) of the first support coupling part (330) is coupled into the first coupling hole (213) to fix the first substrate portion (310) to the upper housing (210).

Thereafter, referring to FIGS. 7(a) and 7(b), the second substrate portion (320) is coupled to the first substrate portion (310). To be more specific, the second substrate portion (320) is accommodated on the support portion (331) of the first support coupling part (330) to allow the third coupling hole (331a) of the first support coupling part (330) to match to the fourth coupling hole (324) of the second substrate portion (320).

Meanwhile, the first connecting port (313) of the first substrate portion (310) and the second connecting port (323) of the second substrate portion (320) are coupled in the abovementioned process. Then, the first fastening part (340) is coupled to the third coupling hole (331a) to fix the second substrate portion (320) to the first substrate portion (310).

Successively, as illustrated in FIGS. 8(a), 8(b), and 8(c), the lens module (100) is coupled to the upper housing (210). To be more specific, the epoxy (150) is coated on the accommodation groove (215) of the upper housing (210) using an epoxy coater (A). Thereafter, a part of the lens module (100) is accommodated into the through hole (211) of the upper housing (210) by being inserted thereinto. Then, the optical axis alignment is adjusted between the lens module (100) and the image sensor mounted with the first substrate portion (310). When the optical axis alignment is completed, the epoxy is initially cured by irradiating UV rays to the epoxy (150) through a UV lamp (B). Successively, a coupled body between the lens module (100) and the upper housing (210) is heated in an oven (C) to fix the lens module (100) to the upper housing (210) by curing the epoxy (150) in earnest.

Then, as illustrated in FIGS. 9(a) and 9(b), a coupled body between the fourth substrate portion (420) and the connector (500) is coupled to the plate (450). To be more specific, the connector (500) is made to pass through the through hole (451) of the plate (450) to accommodate the bottom surface (422) of the fourth substrate portion (420) to the plate (450). At this time, the fifth coupling hole of the plate (450) and the sixth coupling hole (424) of the fourth substrate portion (420) are matched. Then, the coupling portion (432) of the second support coupling part (430) is made to be coupled to the fifth coupling hole to allow the plate (450) to be fixed to the fourth substrate portion (420).

Thereafter, as shown in FIGS. 10(a) and 10(b), the third substrate portion (410) is made to be coupled to the fourth substrate portion (420). To be more specific, the third substrate portion (410) is accommodated on the support portion (431) of the second support coupling part (430) in order to match the seventh coupling hole (431a) of the second support coupling part (430) to the eighth coupling hole (414) of the third substrate portion (410).

Meanwhile, the fourth connecting port (423) of the fourth substrate portion (420) and the third connecting port (413) of the third substrate portion (410) are coupled in the abovementioned process. Then, the second fastening part (440) is coupled to the seventh coupling hole (431a) to fix the third substrate portion (410) to the fourth substrate portion (423).

Then, as shown in FIGS. 11(a) and 11(b), the second substrate portion (320) and the third substrate portion (410) are connected through the flexible substrate (600). To be more specific, the flexible substrate (600) extended from the lateral surface (412) of the third substrate portion (410) is connected to the bottom surface (322) of the second substrate portion (320).

Successively, as shown in FIGS. 12(a) and 12(b), the upper housing (210), the plate (450) and the bottom housing (220) are coupled through the coupling member (810). To be more specific, the upper housing (210), the plate (450) and the bottom housing (220) are arranged in that order to allow the coupling member fastening hole (216) of the upper housing (210), the coupling member fastening hole (452) of the plate (450) and the coupling member fastening hole of the bottom housing (220) to be matched, and then the coupling member (810) is made to be coupled to the coupling member fastening hole (216, 452) to complete the coupling of the housing (200).

However, the order of manufacturing method of camera module thus described in the previous exemplary embodiments may be changed. Particularly, the coupling between the lens module (100) and the upper housing (210) may be implemented whenever the first substrate portion (310) is in a state of being coupled to the housing (210).

Although the present disclosure has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A camera module comprising:
a housing comprising a through hole;
a lens module disposed in the through hole;
a connector penetrating the housing and extending to an outside from an inside of the housing;
a first substrate unit located inside the housing and having an image sensor mounted thereon; and
a second substrate unit disposed inside the housing and connected to the connector;
wherein the first substrate unit includes a first substrate portion having an upper surface on which the image sensor is disposed, and a second substrate portion disposed below the first substrate portion and connected to the second substrate unit,
wherein a space within the housing includes a first space in which the first substrate portion is disposed, and a second space in which the second substrate portion is disposed,
wherein a cross-sectional area of the first substrate portion is smaller than a cross-sectional area of the second substrate portion, and
wherein a cross-sectional area of the first space is smaller than a cross-sectional area of the second space.

2. The camera module of claim 1, comprising a flexible substrate for electrically connecting the first substrate and the second substrate unit, wherein the flexible substrate is coupled to a lower surface of the first substrate unit and a side surface of the second substrate.

3. The camera module of claim 2, wherein a first connecting port is disposed on a lower surface of the first substrate portion,
wherein the second substrate portion includes a second connecting port coupled to the first connection portion,
wherein the second substrate unit includes a third substrate portion connected with the second substrate portion through the flexible substrate and including a third connecting port, and a fourth substrate portion including a fourth connecting port coupled to the third connecting port and connected to the connector, and
wherein the flexible substrate is coupled to a bottom surface of the second substrate portion and to a lateral surface of the third substrate portion.

4. The camera module of claim 3, wherein the housing includes a first coupling hole, and the first substrate unit includes:
a second coupling hole disposed at the first substrate portion and corresponding to the first coupling hole;
a first support coupling part including a support portion having a third coupling hole, a first coupling hole extended from the support portion and a coupling part coupled to the second coupling hole;
a fourth coupling hole disposed at the second substrate portion and corresponding to the third coupling hole; and
a first coupling part coupled to the third coupling hole and to the fourth coupling hole.

5. The camera module of claim 3, wherein the first substrate portion includes a guide hole, and the housing includes a guide lug protruded inwardly, and inserted into the guide hole to guide a coupling position of the first substrate portion.

6. The camera module of claim 3, comprising a plate coupled by the connector, wherein the fourth substrate portion is configured to be connected to the connector by being accommodated into the plate.

7. The camera module of claim 6, wherein the plate includes a fifth coupling hole, and the second substrate unit includes:
a sixth coupling hole disposed at the fourth substrate portion and corresponding to the fifth coupling hole;
a second support coupling part including a support portion having a seventh coupling hole, and a coupling portion extended from the support portion and coupled to the fifth coupling hole and the sixth coupling hole;
an eighth coupling hole disposed at the third substrate portion and corresponding to the seventh coupling hole; and
a second coupling part coupled to the seventh coupling hole and the eighth coupling hole.

8. The camera module of claim 7, wherein the coupling part is coupled to the fifth coupling hole by a third fastening torque, and the second coupling part is coupled to the seventh coupling hole by a fourth fastening torque greater than the third fastening torque.

9. The camera module of claim 2, wherein the first substrate portion, the second substrate portion, the third substrate portion and the fourth substrate portion are disposed in parallel.

10. The camera module of claim 2, wherein the flexible substrate has a shape of being bent three times.

11. The camera module of claim 1, comprising a first sealing member interposed between an outermost lens of the lens module and a lens barrel.

12. The camera module of claim 11, wherein the upper housing includes an EMI (Electro Magnetic Interference) shield can of metal material, and wherein the EMI shield can is grounded through a coupling member of metal material coupling the upper housing and the bottom housing.

13. The camera module of claim 1, wherein the housing includes an upper housing coupled by the lens module and a bottom housing penetrated by the connector, and a second sealing member disposed between the upper housing and the bottom housing.

14. The camera module of claim 1, comprising a third sealing member interposed between the connector and the housing.

15. A vehicle camera installed on a vehicle, wherein the vehicle camera comprises the camera module of claim 1.

* * * * *